April 24, 1934. J. W. BELL 1,956,308
MEASURING DISPENSER
Filed July 15, 1933
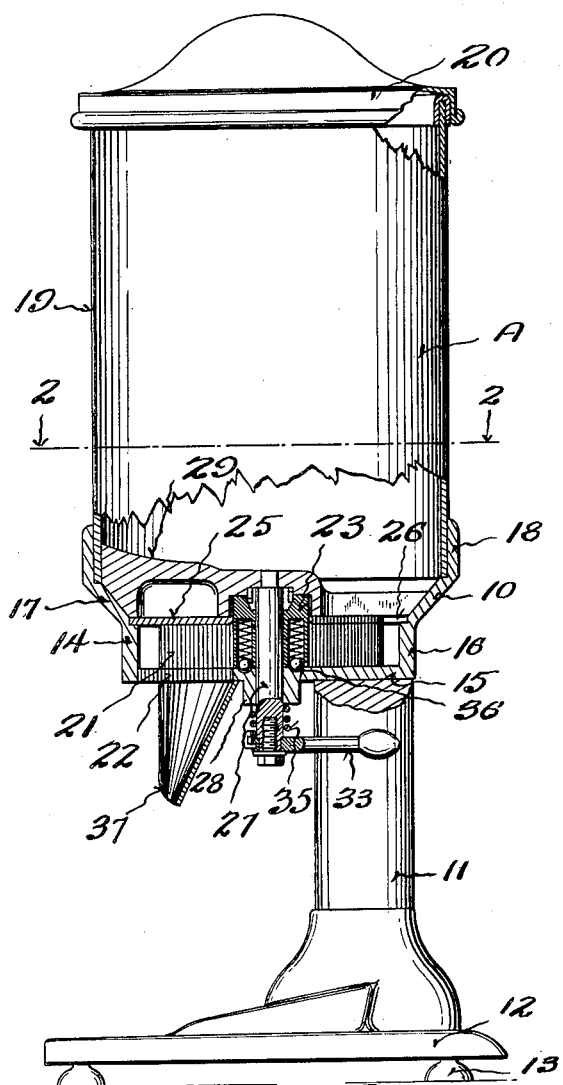
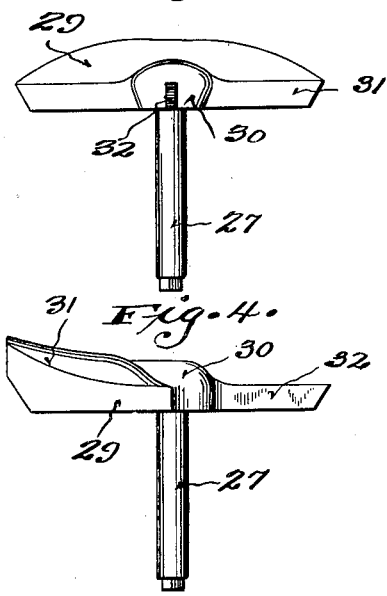
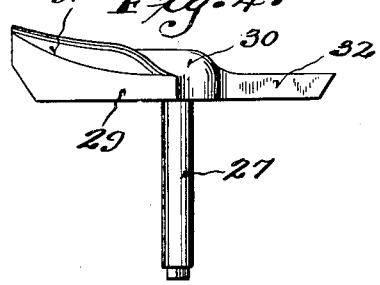
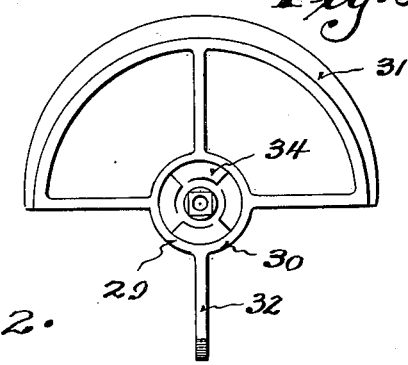
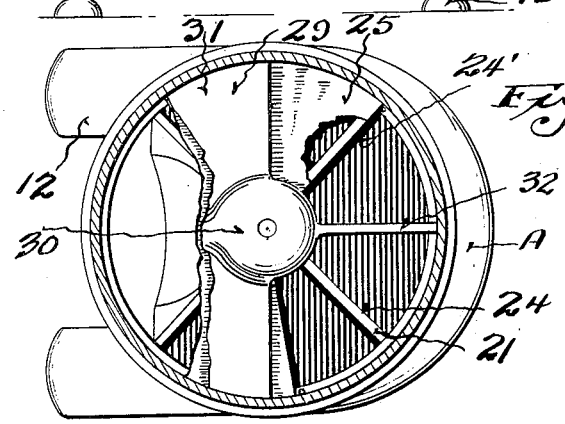
Inventor
J. W. Bell.

Patented Apr. 24, 1934

1,956,308

UNITED STATES PATENT OFFICE 1,956,308

MEASURING DISPENSER

John W. Bell, Chicago, Ill.

Application July 15, 1933, Serial No. 680,603

9 Claims. (Cl. 221—108)

This invention appertains to dispensing machines and more particularly to a novel device for dispensing a measured quantity of material, such as pulverized coffee, malted milk, etc. in an efficient and sanitary manner.

It has heretofore been proposed to provide a measuring dispensing machine, but all of such devices, with which I am familiar, are open to serious objections. One of the main objections is that a uniform quantity of material is not delivered at each operation of the machine, possibly due to the fact that the material tends to pack in the measuring and dispensing pockets to too great an extent, when the storage receptacle is full; and second, the agitating means employed fails to function to insure the proper delivery of the material from said storage receptacle to the measuring and dispensing pockets.

Therefore, it is one of the primary objects of this invention to provide a measuring dispenser, which is so constructed that a uniform quantity of material will be delivered at each operation of the machine irrespective of the amount of the material held in the storage receptacle.

Another salient object of my invention is to provide novel means for actuating the agitator from the dispenser or operating shaft, whereby the agitator will be given an oscillatory motion on each operation of the dispenser or operating shaft, so as to shift the material in the storage container first in one direction and then in the other to insure the dropping or feeding of the material into the measuring and dispensing pockets.

A further object of my invention is the provision of novel means for constructing the agitator whereby the mass of material in the storage receptacle or container will be supported thereby and thus moved with the agitator during the oscillation thereof, the agitator being also constructed as to feed the material in said container or receptacle to the measuring pockets, as the quantity of material decreases in said container.

A further object of my invention is the provision of novel means for continuously operating the measuring device in one direction in a step-by-step movement from the dispenser or operating shaft and for oscillating the agitator with said dispenser or operating shaft.

A still further object of my invention is to provide an improved measuring and dispensing machine of the above character, which will be durable and efficient in use, one that will be simple and easy to manufacture and one which can be placed upon the market at a reasonable cost.

With these and other objects in view, the invention consists in the novel construction arrangement and formation of parts, as will be hereinafter more specifically described, claimed, and illustrated in the accompanying drawing, in which drawing:—

Figure 1 is a side elevation of my improved meassuring and dispensing machine showing the same broken away and partly in section to illustrate structural details.

Figure 2 is a horizontal section through the same, taken on the line 2—2 of Figure 1 looking in the direction of the arrows.

Figure 3 is a rear detail elevation of the agitator.

Figure 4 is a side elevation of the novel agitator.

Figure 5 is a bottom plan view of the agitator.

Referring to the drawing in detail, wherein similar reference characters designate the corresponding parts thorughout the several views, the letter A generally indicates my improved measuring and dispensing machine, which comprises a hollow base 10 which is supported in an elevated position, in any preferred manner, such as by the use of a wall bracket or as shown, by a standard 11 secured to a base plate 12. The base plate 12 may be provided with feet 13 which can be of suction cup variety, so as to preclude the marking of a surface and to prevent the slipping of the base plate on said surface.

The base 10 embodies a circular chamber 14 having a lower flat disc-shaped wall 15 and an annular side wall 16. The upper edge of the wall 16 is flared outwardly and upwardly as at 17 and terminates in an annular straight flange 18 for the reception of the storage container or receptacle 19. This receptacle 18 is open at its bottom, and top and can be formed of glass or other transparent material, so that the contents thereof can be readily seen. A removable cover 20 is employed for closing the upper end of the receptacle or container 19 and obviously, by removing this cover, the material to be dispensed can be readily introduced into said container.

The chamber 14 rotatably receives the measuring device or member 21 and the lower wall 15 at the front thereof is provided with an outlet 22, which can be of the same size and shape as the dispensing and measuring pockets 24 of the measuring device 21.

The measuring device 21 includes a hub 23 supporting the radially extending flat arms 24', which in the present instance are four in number. These arms 24' define the measuring pockets 24. Disposed above the measuring device 21 is a flat circular plate 25, which plate is fitted on a shoulder 26 formed in the side wall 16 of the chamber 14 and this plate constitutes a closure for said chamber. It is to be noted, however, that the rear part of the plate is cut away, as shown in Figures 1 and 2, so as to form an entrance for the material from the container 19 into the chamber 14 and into the measuring and dispensing pockets 24. By referring to Figure 1, it can be seen that the solid part of the plate is arranged above the outlet opening 22.

In order to provide means for operating the dispensing device 21, I provide a dispenser or operating shaft 27. This shaft slidably and rotatably extends through the hub 23 and through a centrally disposed hollow bearing boss 28 formed on the bottom wall 15 of the chamber. The shaft 27 extends above the hub 23 and has rigidly secured thereto the agitator 29, which is mounted above the plate 25. As heretofore stated, the agitator 29 forms one of the salient features of my invention and the same includes a hub 30 having formed thereon at one side thereof a substantially semi-circular-shaped solid portion 31. Extending radially from the hub 30 is an agitator and wiper arm 32 and this arm is disposed at substantially right angles to the inner edge of the semi-circular solid portion 31. The upper face of the solid portion 31 and the hub 30 inclines gradually downwardly toward the blade or wiper arm 32, so that the material in the container 19 will be fed toward the open portion of the plate 25.

The lower end of the shaft 27 extends below the chamber 15 and has rigidly secured thereto an operating handle or crank 33.

From the description so far, it can be seen that upon turning movement of the crank 33, the agitator 29 will be moved therewith and it is contemplated that upon each movement of the crank or handle 33 that the agitator will be turned a quarter of a revolution and a stop can be arranged in the path of the handle, so as to limit the swinging movement thereof. Obviously, as the handle is returned to its normal position, the agitator will be moved therewith and consequently, the agitator has an oscillatory movement.

To permit the rotation of the dispensing member 21 from the shaft 27 in one direction only, the hub 23 of the dispensing member 21 and the hub 30 of the agitator 29 are provided with mating ratchet teeth 34. These teeth are so disposed that upon initial movement of the handle 33 the dispensing member will be rotated a quarter of a revolution with the agitator, but that the teeth will ride over one another upon the return of the handle or crank 33 and the agitator to their normal positions.

A coil spring 35 is placed about the lower end of the shaft 27 and has its terminals anchored respectively in the boss 28 and the crank 33, and this spring functions to return the handle 33, the shaft 27 and the agitator 29 to their normal positions after manual actuations. This spring also allows an upward movement of the shaft 27 and the agitator 29 to allow the ratchet teeth carried by the hub 30 to ratchet over the teeth carried by the hub of the dispensing member 21.

In view of the fact that the dispensing member is rotating a quarter of a revolution on each movement of the crank or handle, the dispensing member will be given a step-by-step movement, so as to bring one pocket 24 after another in registration with the outlet 22.

To permit the proper alinement of a pocket 24 with the outlet 22, spring friction locks are provided. These spring friction locks consist of spring-pressed balls 36 carried by the hub 23 and these balls are adapted to snap into recesses formed in the bottom wall 15 of the chamber at quarters.

A guide chute 37 can be carried by the bottom wall 15, so as to guide the material from the opening 22 into the desired receiving member.

By my improved construction, the agitator 29 functions to reciprocate the entire bulk of material within the container 19 upon each dispensing operation, which insures the proper feeding of the material from said container into the dispensing and measuring pockets. In other devices, with which I am familiar, the agitators merely cut through the lower portion of the material in the container and operate in one direction only.

When the oscillating agitator 29 is in action, it lifts the coffee vertically and then drops it, making the coffee lift and fall at the end of each movement of said agitator. This jarring action is effective in breaking down the caking tendency which exists in pulverized coffee. This action is caused by the teeth on the agitator 29 rising over the corresponding teeth on the dispensing rotor 21.

The solid portion of the agitator acts as an effective means for supporting the bulk of the material in the container and thus prevents the undue packing of the material in the measuring pockets and insures substantially the same quantity of material in the pockets at all times, irrespective of whether the container is full or only partially full. The blade 32 on its rearward movement acts as means for levelling off or smoothing material in the pockets.

From the foregoing description, it can be seen that I have provided an exceptionally simple and novel form of dispensing means, which will effectively operate under all working conditions.

Changes in details may be made without departing from the spirit or the scope of this invention, but what I claim as new is:—

1. A measuring and dispensing machine comprising a base having a chamber therein, a container for the material to be dispensed mounted upon the base, the chamber having an outlet opening, a dispensing wheel provided with measuring and dispensing pockets rotatably mounted in the chamber, an agitator above the dispensing wheel, and means for operating the wheel in one direction in a step-by-step movement and the agitator in both directions.

2. A measuring and dispensing machine comprising a base having a dispensing chamber provided with an outlet at one side, a receptacle for the material supported by the base and arranged above the chamber, a dispensing wheel rotatably mounted in the chamber having dispensing and measuring pockets movable past the opening, an agitator disposed above the wheel, an operating shaft mounted for oscillating movement, means for rotating the dispensing wheel in one direction in a step-by-step movement from the shaft, and means for directly moving the agitator with said shaft.

3. A measuring and dispensing machine comprising a base having a chamber provided with an outlet at one side, a container for the material to be dispensed supported by the base, a dispensing wheel rotatably mounted in the chamber having measuring and dispensing pockets movable past the opening, an agitator arranged above the dispensing wheel, a single operating shaft, manual means for turning the shaft in one direction for limited movement, means for automatically returning the shaft to a normal position, means for rotating the dispensing wheel in one direction in a step-by-step movement from said shaft, and means connecting the agitator with the shaft for movement therewith in both directions.

4. A measuring and dispensing machine comprising a base having a chamber provided with an outlet at one side, a container for the material to be dispensed supported by the base, a dispensing wheel rotatably mounted in the chamber having measuring and dispensing pockets movable past the opening, an agitator arranged above the dispensing wheel, a single operating shaft, manual means for turning the shaft in one direction for limited movement, means for automatically returning the shaft to a normal position, means for rotating the dispensing wheel in one direction in a step-by-step movement from said shaft, means connecting the agitator with the shaft for movement therewith in both directions, said agitator including a solid portion for supporting the bulk of material in said container, and a wiper blade.

5. A measuring and dispensing machine comprising a base having a chamber provided with an outlet at one side, a container for the material to be dispensed supported by the base, a dispensing wheel rotatably mounted in the chamber having measuring and dispensing pockets movable past the opening, an agitator arranged above the dispensing wheel, a single operating shaft, manual means for turning the shaft in one direction for limited movement, means for automatically returning the shaft to a normal position, means for rotating the dispensing wheel in one direction in a step-by-step movement from said shaft, means connecting the agitator with the shaft for movement therewith in both directions, said agitator including a solid portion for supporting the bulk of material in said container, and a wiper blade, said solid portion gradually inclined downwardly and inwardly from its periphery toward the scraper blade.

6. A measuring and dispensing machine comprising a base having a chamber provided with an outlet at one side, a container for the material to be dispensed supported by the base, a dispensing wheel rotatably mounted in the chamber having measuring and dispensing pockets movable past the opening, an agitator arranged above the dispensing wheel, a single operating shaft, manual means for turning the shaft in one direction for limited movement, means for automatically returning the shaft to a normal position, means for rotating the dispensing wheel in one direction in a step-by-step movement from said shaft, means connecting the agitator with the shaft for movement therewith in both directions, and friction means for detachably holding the dispensing wheel in predetermined positions.

7. A measuring and dispensing device comprising a base having a chamber provided with an outlet at one side, a container for the material to be dispensed mounted upon said base above the chamber, a dispenser wheel rotatably mounted in the chamber having measuring and dispensing pockets movable past the opening, an agitator mounted above the dispensing wheel, an operating shaft slidably and rotatably extending through the chamber and the wheel, means rigidly connecting the agitator with the shaft, a hand crank for turning the shaft in one direction, spring means for moving the shaft in an opposite direction, mating ratchet teeth connecting the agitator and the dispensing wheel together, and friction means for detachably holding the dispenser wheel in predetermined positions.

8. A measuring and dispensing device comprising a base having a dispensing chamber provided with an outlet at one side, a dispensing wheel rotatably mounted in the chamber having measuring and dispensing pockets movable one at a time past said outlet, a plate supported by the base directly above the dispensing wheel, having opening diametrically opposite the outlet, an agitator mounted above the plate including a hub, a solid portion carried by the hub and a wiper arm normally disposed above the opening in the plate, an operating shaft rotatably and slidably mounted in the base and in the dispensing wheel, means rigidly connecting the agitator with the shaft, mating ratchet teeth on the dispensing wheel and agitator whereby the wheel is rotated in one direction from the agitator, a hand crank for turning the shaft in one direction, and spring means for returning the shaft to its normal position after movement by said crank.

9. A measuring and dispensing machine comprising a base having a chamber therein, a container for the material to be dispensed mounted upon the base, the chamber having an outlet opening, a dispensing wheel provided with measuring and dispensing pockets rotatably mounted in the chamber, an agitator above the dispensing wheel, means for operating the wheel in one direction in a step-by-step movement and the agitator in both directions, and means for raising and lowering the agitator during the oscillatory movement thereof.

JOHN W. BELL.